L. R. SIEGEL.
DENTAL CROWN REMOVER.
APPLICATION FILED FEB. 7, 1917.
1,245,992.
Patented Nov. 6, 1917.
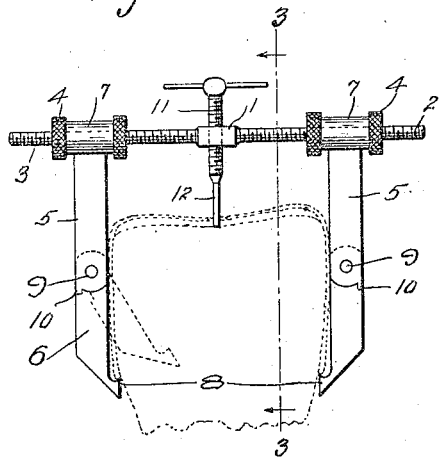
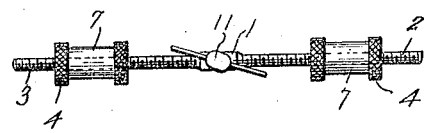
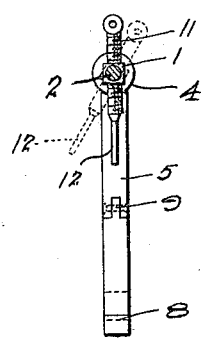
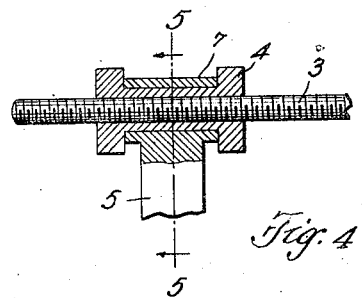
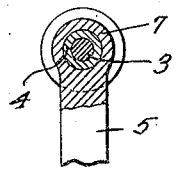
INVENTOR.
L. R. SIEGEL
BY John A. Bonnhardt
ATTORNEY.

UNITED STATES PATENT OFFICE.

LOUIS R. SIEGEL, OF CLEVELAND, OHIO.

DENTAL-CROWN REMOVER.

1,245,992. Specification of Letters Patent. Patented Nov. 6, 1917.

Application filed February 7, 1917. Serial No. 147,144.

*To all whom it may concern:*

Be it known that I, LOUIS R. SIEGEL, a citizen of the United States, residing at Cleveland, in the county of Cuyahoga and State of Ohio, have invented certain new and useful Improvements in Dental-Crown Removers, of which the following is a specification.

This invention relates to dentists' tools, and comprises a device for removing crowns from teeth, the object being to provide improved means for detaching and removing artificial tooth crowns without injury, and with little or no pain to the patient. The tool embodies a pair of jaws adapted to grip the crown, with a screw to apply the necessary pressure. The jaws are adjustable to fit crowns of different sizes, and are jointed to accommodate the jaws to the contour of different teeth, a somewhat different application being necessary with rear teeth than with front teeth, for example.

In the accompanying drawings—

Figure 1. is a side elevation illustrating the manner of use of the tool.

Fig. 2. is a top plan view.

Fig. 3. is a section on the line 3—3 of Fig. 1.

Fig. 4. is a detail in section of the adjusting device.

Fig. 5. is a detail in section on the line 5—5 of Fig. 4.

Referring specifically to the drawings, 1 indicates a central block from the opposite ends of which project right and left screws or threaded bars 2 and 3, and mounted on these screws are threaded bushings 4, the ends of which are knurled so that they can be easily turned. The jaws are carried by these bushings, each jaw having a tubular part 7 which is sleeved over the bushing, and can be turned so that the jaws will project at the desired angle. Each jaw consists of two sections 5 and 6, the former being integral with the sleeve 7, and the sections are hinged together as indicated at 9, with a stop 10 to limit the backward movement of the hinge joint. At the ends the jaw sections 6 have hooks 8 to engage under the edge of the crown.

The block 1 is tapped to receive a screw 11 from which projects a pin 12, and the screw may be turned to give the lifting pressure.

In the use of the tool, a puncture is made in the upper face of the crown, to allow the pin 12 to bear against the tooth. The jaws are adjusted by the bushings 4 according to the width of the tooth and the hooks 8 engaged under the crown. Then by turning in the screw 11 the crown is lifted and removed. It will be noted that the jaws may be swung on the bushings 4 to apply the pressure at any desired angle. Or, stated in another way, the screw 11 may be applied at an angle laterally to the jaws. This is useful in case the central part of the tooth is decayed, as by setting the screw at an angle the pin 12 can be placed against a solid part of the tooth, so that when the pressure is applied the pin will not break the tooth. This is quite important in removing crowns from decayed teeth. This manner of use is illustrated in dotted lines in Fig. 3. The joints at 9 permit the sections 6 to be swung in to engage the hooks under the edges of crowns on tapering teeth, either on one or both sides, which is advantageous in removing crowns from teeth of various or irregular shapes.

I claim:

1. A dental crown remover, comprising a pair of connected jaws, each jaw having an inner section and an outer section hinged thereto and provided with a hook to engage under the edge of the crown, and means to apply lifting pressure to the jaws.

2. A dental crown remover having a pair of hooked jaws, and a connecting pivot bar between the jaws, the ends of the bar extending through bearing openings in the upper ends of the jaws, permitting the jaws to swing laterally in planes at an angle to the axle of the bar.

3. A dental crown remover, comprising a pair of jaws, a threaded connecting bar between the same, threaded bushings adjustable along the bar, the jaws being pivoted to the bushings to swing laterally, and a pressure screw mounted on the bar, between the jaws.

4. A dental crown remover comprising a block having screws projecting oppositely therefrom, bushings adjustable on the screws, jaws pivoted to the bushings to swing laterally, and a pressure screw tapped through the block.

5. A dental crown remover comprising a pair of jaws adjustably connected together, and a pressure screw located between the jaws and pivotally connected thereto to swing in a plane transverse to the plane of the jaws, to apply pressure at an angle to said plane.

In testimony whereof, I do affix my signature in presence of two witnesses.

LOUIS R. SIEGEL.

Witnesses:
 JOHN A. BOMMHARDT,
 HARRY A. THOMPSON.

Copies of this patent may be obtained for five cents each, by addressing the "Commissioner of Patents, Washington, D. C."